April 21, 1925.  1,534,574
J. L. DONAT
CUSHIONED WHEEL CONSTRUCTION
Filed Feb. 1, 1923
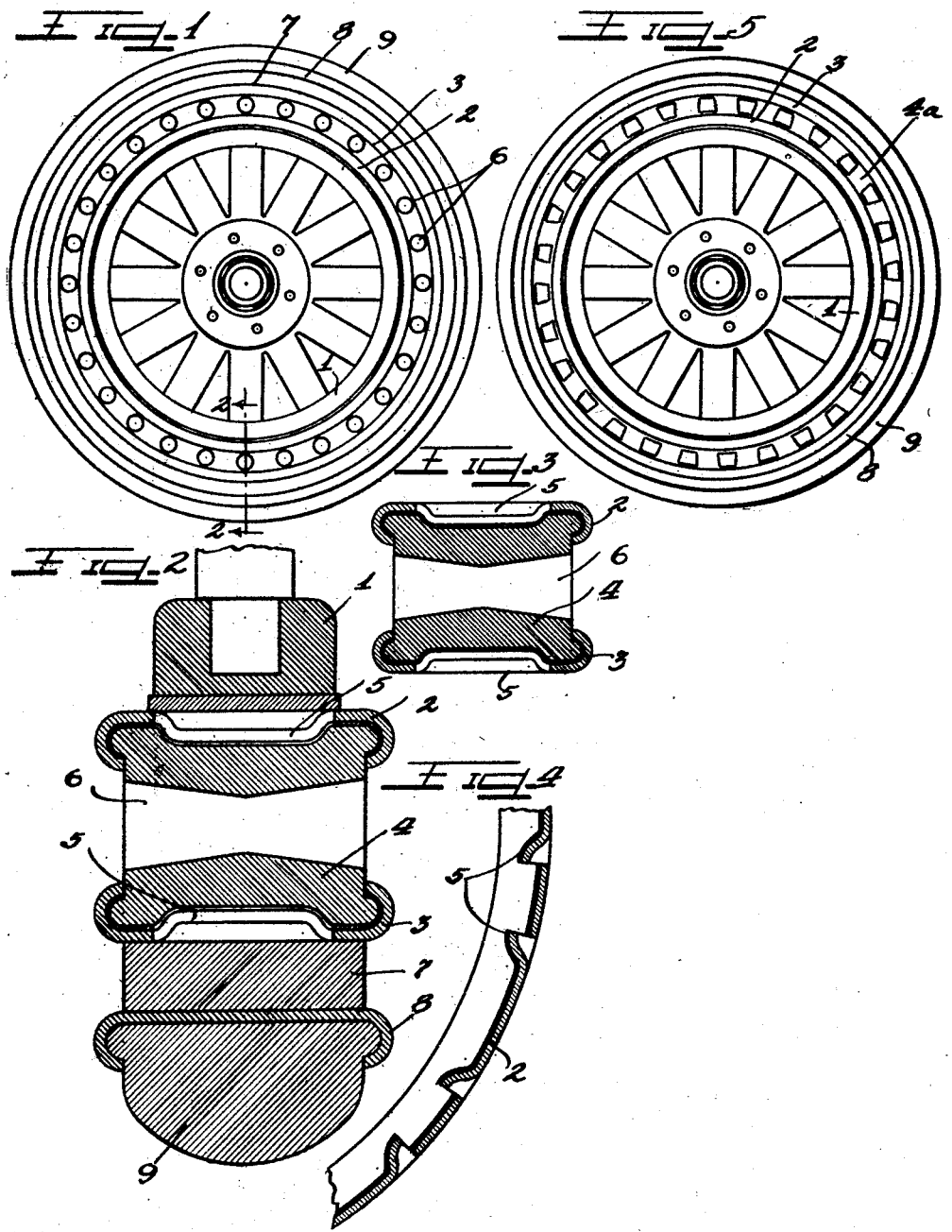
WITNESSES
INVENTOR
JOSEPH L. DONAT
by
Atty.

Patented Apr. 21, 1925.

1,534,574

UNITED STATES PATENT OFFICE.

JOSEPH L. DONAT, OF CHICAGO, ILLINOIS.

CUSHIONED-WHEEL CONSTRUCTION.

Application filed February 1, 1923. Serial No. 616,419.

*To all whom it may concern:*

Be it known that I, JOSEPH L. DONAT, a citizen of the United States, and a resident of the city of Chicago, in the county of Cook and State of Illinois, have invented certain new and useful Improvements in a Cushioned-Wheel Construction; and I do hereby declare that the following is a full, clear, and exact description of the same, reference being had to the accompanying drawings, and to the numerals of reference marked thereon, which form a part of this specification.

This invention relates to a cushioned wheel construction embodying either a pneumatic or solid cushion tread element.

It is an object of this invention to provide a novel resilient support for a tire tread that will sustain any large load and at the same time provide a proper yield for light loads.

It is also an object of this invention to permanently anchor the cushion element by concentric members of sufficient resiliency or yielding qualities.

With these and other objects in view, which will become more apparent in the following description and disclosures, this invention comprises the novel structure and combinations of parts hereinafter described and more particularly pointed out and defined in the appended claim.

In the accompanying drawings, which illustrate certain preferred embodiments of this invention, and in which similar reference numerals refer to similar features in the different views:

Figure 1 is an elevational view of a wheel embodying this invention.

Figure 2 is an enlarged section upon the line 2—2 of Figure 1.

Figure 3 is a section through the cushioning element shown in Figure 2 upon a slightly reduced scale.

Figure 4 is a fragmentary section through an encircling ring of the cushioning member.

Figure 5 is an elevational view of a modified form of the invention.

As shown on the drawings:

In referring now to Fig. 1, it will be noted that a wheel has been illustrated which comprises any usual hub from which the spokes radiate. In the first form of the invention illustrated, the spokes have tenons that fit in sockets or mortises in the felloe 1.

A novel form of cushioning device surrounds the felloe 1, and the same comprises a pair of concentric and resilient members 2 and 3 preferably made of spring metal or the like. The lateral margins of these members are curved or curled toward each other similar to a clincher rim. These members 2 and 3 are spaced apart for receiving and permanently retaining some yieldable filler substance, such as rubber, 4 which may be moulded between said members. If desirable, a fabric lining may first be applied to the opposed surfaces of said members. The spring members 2 and 3 are provided with lugs or tongues 5 that are directed into or embedded in the rubber 4 to prevent relative slipping or movements of the parts. The rubber filler 4 is preferably provided with a series of transverse apertures 6 which in the present instance converge inwardly from opposite sides so that the center is not weakened as much as the outer portions. This cushioning device may be suitably secured upon the felloe 1 by any well known means.

A wooden ring 7 or the like is preferably placed over the outer circumference of the cushioning device and a clincher rim 8 surrounds the wooden ring 7, and retains the solid rubber tread 9. The tread 9 and ring 7 may be suitably anchored in place by any common method. This construction is admirably suited for sustaining heavy loads, such as are commonly carried by trucks.

In Fig. 5 there is illustrated a structure which is suitable for sustaining lighter loads. In Fig. 5, the cushioning device comprises a pair of resilient concentric ring members 2 and 3 as in the first form with a cushioning member 4ª therebetween, which may be of solid rubber and which may be provided with transverse apertures of polygonal shape. In this case, the clincher rim 8 containing the tread 9 surrounds the ring member 3, the wooden ring being omitted.

In the drawings, no means are illustrated for preventing lateral movement of the parts on the felloes, since this can be accomplished in any well known way.

I am aware that numerous details of construction may be varied through a wide range without departing from the principles of this invention, and I therefore do not purpose limiting the patent granted otherwise than necessitated by the prior art.

I claim as my invention:

In a wheel structure, a felloe, outer and inner concentric resilient integral rings removably mounted on said felloe and having rims curved towards each other, cushioning means permanently disposed between said rings and retained by said rims, tongues struck inward from said rings to engage said cushioning means, and a tire mounted exterior to said outer ring.

In testimony whereof I have hereunto subscribed my name in the presence of two subscribing witnesses.

JOSEPH L. DONAT.

Witnesses:
 CARLTON HILL,
 OSCAR HARTMANN.